United States Patent [19]

Brannon et al.

[11] 4,396,676

[45] Aug. 2, 1983

[54] ROVING

[75] Inventors: Robert C. Brannon, Newark; Leonard J. Adzima, Pickerington; Timothy W. Ramey, Columbus, all of Ohio

[73] Assignee: Owens-Corning Fiberglas Corporation, Toledo, Ohio

[21] Appl. No.: 412,485

[22] Filed: Aug. 30, 1982

Related U.S. Application Data

[62] Division of Ser. No. 286,116, Jul. 23, 1981, Pat. No. 4,367,301.

[51] Int. Cl.$^3$ .................. B32B 17/04; C08L 67/02
[52] U.S. Cl. .................................. 428/392; 264/138; 264/257; 428/378; 428/391; 428/430; 428/431; 428/429; 524/86; 524/238; 523/203; 523/523; 523/527; 523/508

[58] Field of Search ............... 428/378, 429, 482, 483, 428/392, 431, 430, 395, 391; 264/136, 137, 257, 258; 524/86, 238; 523/527, 508, 203, 523

[56] References Cited

U.S. PATENT DOCUMENTS

| | | | |
|---|---|---|---|
| 3,262,809 | 7/1966 | Aber | 260/29.2 E |
| 3,772,241 | 11/1973 | Kroekel | 525/190 |
| 4,309,326 | 1/1982 | Sage | 428/392 |

*Primary Examiner*—Ellis P. Robinson
*Attorney, Agent, or Firm*—Ronald C. Hudgens; Greg Dziegielewski; Philip R. Cloutier

[57] ABSTRACT

Cocoa amine acetate and a polyamide condensate, in combination as a lubricant in a glass size, result in glass strands exhibiting less fuzz than does glass sized with a size containing either of the two components, individually.

6 Claims, No Drawings

ROVING

This application is a division of application Ser. No. 286,116, filed July 23, 1981, now U.S. Pat. No. 4,367,301.

TECHNICAL FIELD

This invention pertains to an improved roving suitable for incorporation in molding compounds.

In another of its aspects, this invention pertains to improved molded products in which such roving is incorporated.

BACKGROUND OF THE INVENTION

The use of unsaturated polyester compounds in combination with thermoplastic resins and fillers to produce molding compositions is well known. Such molding compositions are disclosed in U.S. Pat. No. 3,772,241 to Kroekel. These compositions, and like compositions intended to polymerize when molded under heat and pressure, are generally combined with fillers and chopped glass, produced from roving, to produce molded products having appearance surfaces, that is, the surface exposed to view, with minimum irregularities or undulations, known as Class A surfaces.

The use of chopped glass as reinforcement in such molding compounds is well known. Such chopped glass is produced in the form of individual strands which are sized, gathered into roving, which roving is then chopped to the desired length and incorporated into the resin composite prior to molding.

Such sizes as are used generally comprise a polyester emulsion base, a lubricant, film formers, and the like and are extremely important in imparting to the reinforcing glass its ability to be wetted out by the molding compound. These sizes are also important in that they protect the glass in its handling subsequent to being sized and are influential in minimizing the amount of fuzz and fly which is produced on, and with, the glass, the fuzz and fly having a decided affect upon the appearance surface of the molded product.

Many lubricants for inclusion in such sizes are known. However, there has now been discovered a lubricant system comprising a combination of lubricants which decidedly reduces the fuzz content of the chopped glass and, surprisingly, reduces the fuzz content of the chopped glass to a level lower than that attained when the lubricants are employed individually.

STATEMENT OF THE INVENTION

According to this invention, there is provided an improved polyester-based size comprising, as the lubricant, cocoa amine acetate and a polyamide condensate.

In the preferred embodiment of the invention, the cocoa amine acetate and the polyamide condensate comprise about 0.1 percent by weight of the aqueous based size.

In another preferred embodiment of the invention, the cocoa amine acetate comprises from about 40 to about 60 weight percent (solid basis) of the lubricant system and the polyamide condensate comprises from about 60 to about 40 weight percent of the lubricant system. In the most preferred embodiment, the cocoa amine acetate and the polyamide condensate each comprise about 50 weight percent of the lubricant system.

Also according to this invention, there is provided glass strands having their surface in contact with the residue formed by removing water from an aqueous composition comprising a polyester emulsion and a lubricant system comprising cocoa amine acetate and a polyamide condensate.

Also according to this invention, there is provided a glass-reinforced molded product comprising glass fibers sized with an aqueous composition comprising a polyester emulsion, cocoa amine acetate and a polyamide condensate.

Also, according to this invention there is provided a method of producing molded articles having an improved appearance surface which comprises incorporating into a moldable unsaturated polyester resin composition glass strands sized with an aqueous composition comprising a polyester emulsion and a lubricant system comprising cocoa amine acetate and a polyamide condensate.

This invention is employable using any moldable composition. It is preferably employed with molding compositions such as described in the aforementioned patent.

This invention is employable using any glass fibers conventionally employed as reinforcement for sheet and bulk molding compounds. The glass fibers are sized by methods conventional in the art.

This invention is employable using as the principal ingredient of the aqueous based size any suitable polyester emulsion. One particularly suitable polyester emulsion is CX412 available from Owens-Corning Fiberglas Corporation, Toledo, Ohio. It is 67.16 weight percent solids.

The polyester emulsion will be employed in the size in an amount of from about 10 to about 38 percent by weight and preferably in an amount of about 30 percent by weight.

This invention is employable using any suitable cocoa amine acetate. One particularly suitable cocoa amine acetate is PF-710 produced by Quaker Chemical Company. It is aminated coconut oil.

The cocoa amine acetate will be employed in the aforementioned amount in the size composition.

This invention is employable using any suitable polyamide condensate. One particularly suitable polyamide condensate is Emery 67600 produced by Emery Industries. It is a solution of polyethyleneimine comprising 50 percent solids, 33 percent water and 17 percent acetic acid.

The polyamide condensate will be employed in the aforementioned amount in the size composition.

In addition to the aforementioned components, the size composition can contain silanes, such as g-methacryloxypropyl-trimethoxysilane in amounts of about 0.10 percent by weight, and other components conventionally employed in such sizes.

The size of this invention is prepared by conventional size preparation methods and the incorporation of the sized strands into the molding composition is performed in accordance with conventional methods.

The decrease in fuzz level of chopped glass strands employing this invention is demonstrated by the following example.

A size of the following composition was applied to glass fibers.

| Component | Percent by Weight |
|---|---|
| Polyester Emulsion | 30.0 |
| Silane | 0.5 |

-continued

| Component | Percent by Weight |
| --- | --- |
| Acetic Acid | 0.05 |
| Cocoa Amine Acetate | 0.05 |
| Polyamide Condensate | 0.10 |
| Water (Deionized) | Balance |

The sized strands were formed into rovings which were dried and chopped and the amount of fuzz produced from five minutes of the chopping operation was measured.

Similar procedures were carried out with three other sizes, one of which contained no lubricant, one of which contained 0.10 weight percent cocoa amine acetate, only, as the lubricant, and one of which contained 0.10 weight percent polyamide condensate, only, as the lubricant.

Results were as follows:

| | | Chopper Fuzz, g.* | |
| --- | --- | --- | --- |
| Lubricant | Conc., Wgt. % | Average | Total |
| None | 0 | 0.252 | 1.763 |
| Polyamide Condensate | 0.10 | 0.216 | 1.511 |
| Cocoa Amine Acetate | 0.10 | 0.255 | 1.782 |
| PAC & CAA | 50/50 @ 0.10 Total | 0.038 | 0.263 |

*For seven trials.

The above data indicate a dramatically unexpected fuzz reduction of from about 82 to about 85 percent when employing the combination of lubricants over use of either lubricant, individually, when considering the total fuzz produced in seven trials.

It will be evident from the foregoing that various modifications can be made to this invention. Such, however, are considered to be within the scope of the invention.

We claim:

1. Glass strands having their surface in contact with residue formed by removing water from an aqueous size composition comprising a polyester and a lubricant system comprising cocoa amine acetate and a polyamide condensate comprising polyethyleneimine.

2. Glass strands having their surface in contact with the residue formed by removing water from the composition of claim 1 in which said cocoa amine acetate and said polyamide each comprise about 50 weight percent of said lubricant system.

3. A glass-reinforced molded product comprising glass fibers sized with the composition of claim 1.

4. A glass-reinforced molded product comprising glass fibers sized with the composition of claim 2.

5. A method of producing a molded article which comprises incorporating into a moldable unsaturated polyester resin composition the glass strands of claim 1 and molding the resulting composite under heat and pressure.

6. A method of producing a molded article which comprises incorporating into a moldable unsaturated polyester resin composition glass strands sized with the aqueous size composition of claim 2 and molding the resulting composite under heat and pressure.

* * * * *